United States Patent [19]

Grochowski et al.

[11] 4,400,363

[45] Aug. 23, 1983

[54] METHOD FOR THE REMOVAL OF SULFUR OXIDES AND NITROGEN OXIDES FROM EXHAUST GASES

[75] Inventors: Horst Grochowski, Oberhausen; Karl Knoblauch, Essen, both of Fed. Rep. of Germany

[73] Assignee: Bergwerksverband GmbH, Essen, Fed. Rep. of Germany

[21] Appl. No.: 253,652

[22] Filed: Apr. 13, 1981

[30] Foreign Application Priority Data

Apr. 18, 1980 [DE] Fed. Rep. of Germany ....... 3014934

[51] Int. Cl.$^3$ ........................ B01J 8/00; C01B 21/00; C01B 17/00
[52] U.S. Cl. .................................... 423/239; 423/244
[58] Field of Search ................ 423/239, 244; 422/172

[56] References Cited

U.S. PATENT DOCUMENTS 4,272,497  6/1981  Takahashi et al. ............. 423/239 A

FOREIGN PATENT DOCUMENTS 2911712  9/1980  Fed. Rep. of Germany .

*Primary Examiner*—Gregory A. Heller
*Attorney, Agent, or Firm*—Michael J. Striker

[57] ABSTRACT

Sulfur oxides and nitrogen oxides are removed from exhaust gases containing additionally oxygen and steam, by the addition of gaseous ammonia at temperatures between about 110° and 180° C. The exhaust gases travel in the interior of a reactor across a travelling bed which goes from above to below, composed of granulated, carbon-containing adsorbent with or without catalysts. In the first travelling bed initially a large portion of the sulfur oxides is adsorptively removed. In the second travelling bed after dosed addition of gaseous ammonia the nitrogen oxides are catalytically reduced to nitrogen as well as further sulfur oxides being separated. The improvement involves extending the path of the exhaust gases between the first and the second travelling beds and introducing into the volume of the exhaust gas stream between the travelling beds a forced mixture of dosed added ammonia with the exhaust gas departing from the first travelling bed.

3 Claims, 3 Drawing Figures

METHOD FOR THE REMOVAL OF SULFUR OXIDES AND NITROGEN OXIDES FROM EXHAUST GASES

BACKGROUND OF THE INVENTION

German published application No. 29 11 712 concerns a method for the removal of sulfur oxides and nitrogen oxides from exhaust gases, which additionally contain oxygen and steam, by addition of gaseous ammonia at temperatures between about 110° and 180° C., whereby the exhaust gas travels in the interior of the reactor across a travelling bed which goes from above to below, of granulated, carbon-containing adsorbent with or without introduced catalysts, whereby in a first travelling bed initially a large portion of the sulfur oxide is adsorptively removed and in a second travelling bed, after dosed addition of gaseous ammonia, the nitrogen oxides are catalytically reduced to nitrogen as well as further sulfur oxide being separated.

It is known to blow ammonia into the exhaust, for removal of sulfur oxide and nitrogen oxide, whereupon the nitrogen oxide is catalytically reduced on activated carbon or activated coke with formation of nitrogen and steam, and the sulfur oxide is separated as ammonium sulfate or ammonium hydrogen sulfate at temperatures of 180° to 230° C. (see German Offenlegungsschrift No. 24 33 076).

If one wishes to accomplish the removal of sulfur oxides and nitrogen oxides at lower temperatures using the smallest possible addition of ammonia into the exhaust gas, it is necessary to first remove much of the sulfur oxides from the exhaust gas, before the ammonia is mixed with the exhaust gas for removal of the nitrogen oxides. It is therefore extremely important first to lower the $SO_2$-partial pressure to substantially below the $NO_x$-partial pressure, thereby allowing the chemical reaction to preferentially proceed between the $NO_x$ and the ammonia.

For that reason, the method of German published application No. 29 117 12 is described as a two-stage method, whereby in the first stage preferably sulfur oxide is absorptively removed and in the second stage after dosed addition of gaseous ammonia preferably nitrogen oxide is reduced catalytically to nitrogen. Simultaneously in the second stage still more sulfur oxide is separated, so that the exhaust gas exhibits the desired degree of desulfurization.

SUMMARY OF THE INVENTION

The invention is thus based upon the object of improving the method of German published application No. 29 117 12 to make it more effective.

This object is achieved according to the present invention by introducing into the volume of the exhaust gas stream between the first and the second travelling bed a forced mixture of dosed added ammonia with the exhaust gas departing from the first travelling bed.

Introducing a forced mixture comprises thoroughly to distribute the ammonia into the exhaust gas stream and to improve the degree of distribution (mixture) of the two components by extending the path of the exhaust gas stream.

It was surprisingly discovered that the effectiveness of the method depends very strongly on the more or less good distribution of ammonia into the exhaust gas stream between the first and the second travelling bed.

In order to obtain such a good distribution, an intermediate partition will be installed between the first and the second travelling bed, through which the path of the exhaust gas will be substantially extended, compared to the construction without intermediate partition. In this thus guided exhaust gas stream dosed ammonia will be added in one place or in several places. Advantageously the dosed addition of ammonia will be introduced to a small extent in the space above and for the most part the space below, after the first travelling bed.

For accomplishment of the method according to the invention reactors are used in which the content of activated coke lies up to about 2000 m³. Depending on the size of the flow surface of the travelling beds and therewith upon the height of the reactor, the ammonia will be dosed into several places in the exhaust gas stream.

The exterior dimensions for the reactor resulting from this amount of activated coke enables a space-saving construction for a two-stage reactor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The method according to the present invention will be more precisely described by means of the drawing which schematically represents the reactor for the execution of the method. It shows.

Figure 1:
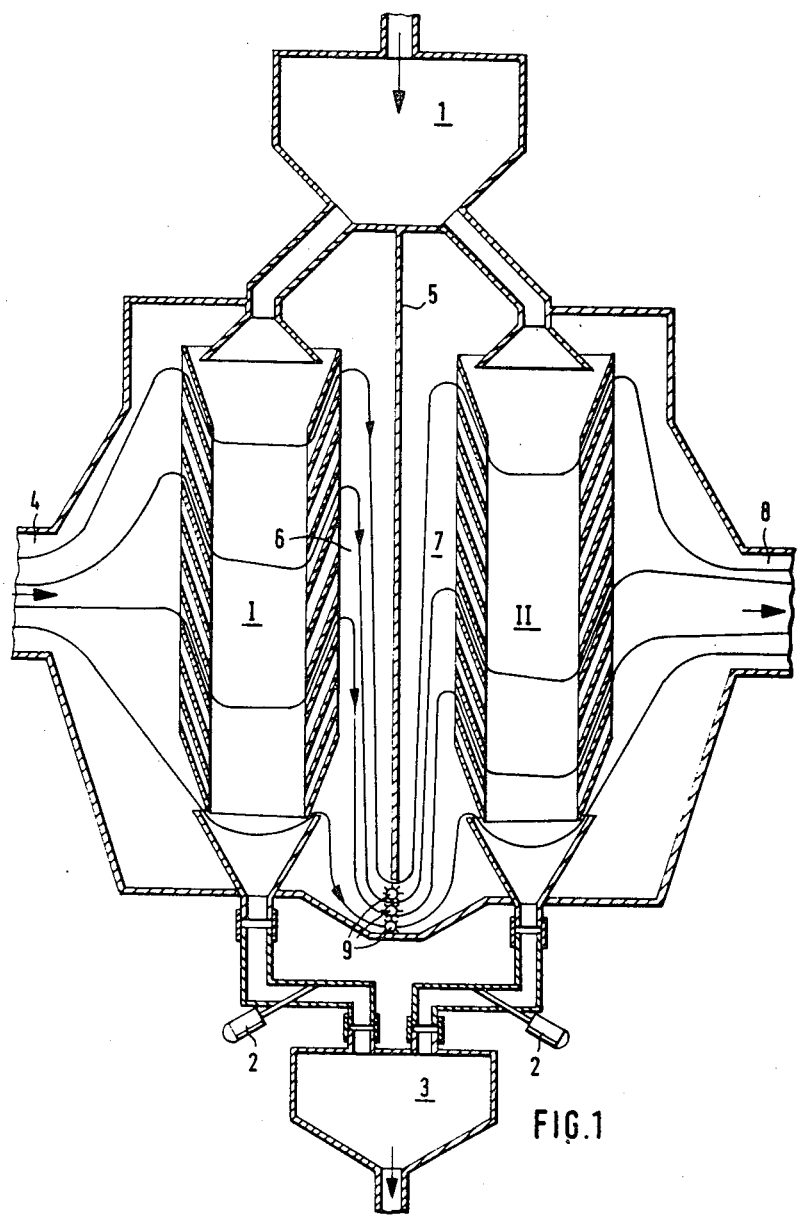
FIG. 1 is a travelling bed reactor with two travelling beds and an intermediate partition separating them with an opening located at the lower end and an ammonia addition arrangement under the opening.

According to FIG. 1, two travelling beds I and II are supplied with activated coke from a storage bunker 1, disposed together in a reactor. The hourly throughput and therewith the dwell period of the activated coke in the travelling beds will be controlled by the discharge organ 2, for example a vibrating sluice. Through the discharge bunker 3 the activated coke will leave the reactor and be introduced into a regeneration apparatus.

The exhaust gas enters the reactor through gas entry connection 4 and flows first of all into the traveling bed. The gas space between travelling beds I and II will be separated by an intermediate partition 5, so that a gas accumulation space 6 on the flow-off side of travelling bed I and a gas flow-into space 7 at the leading edge of travelling bed II are formed.

At the lower end of intermediate partition 5 there is located an opening from gas accumulation space 6 into gas flow-into space 7 with an arrangement 9 for addition of ammonia, which brings about a forced mixture within the exhaust gas. In this manner the ammonia will be simultaneously distributed across the entire exhaust gas stream and introduced through gas flow-into space 7 into travelling bed II.

After the exhaust gas has passed travelling bed II, it will be led away from the reactor through gas exit connection 8. The path of the exhaust gas through the reactor is indicated by arrows.

Figure 2:
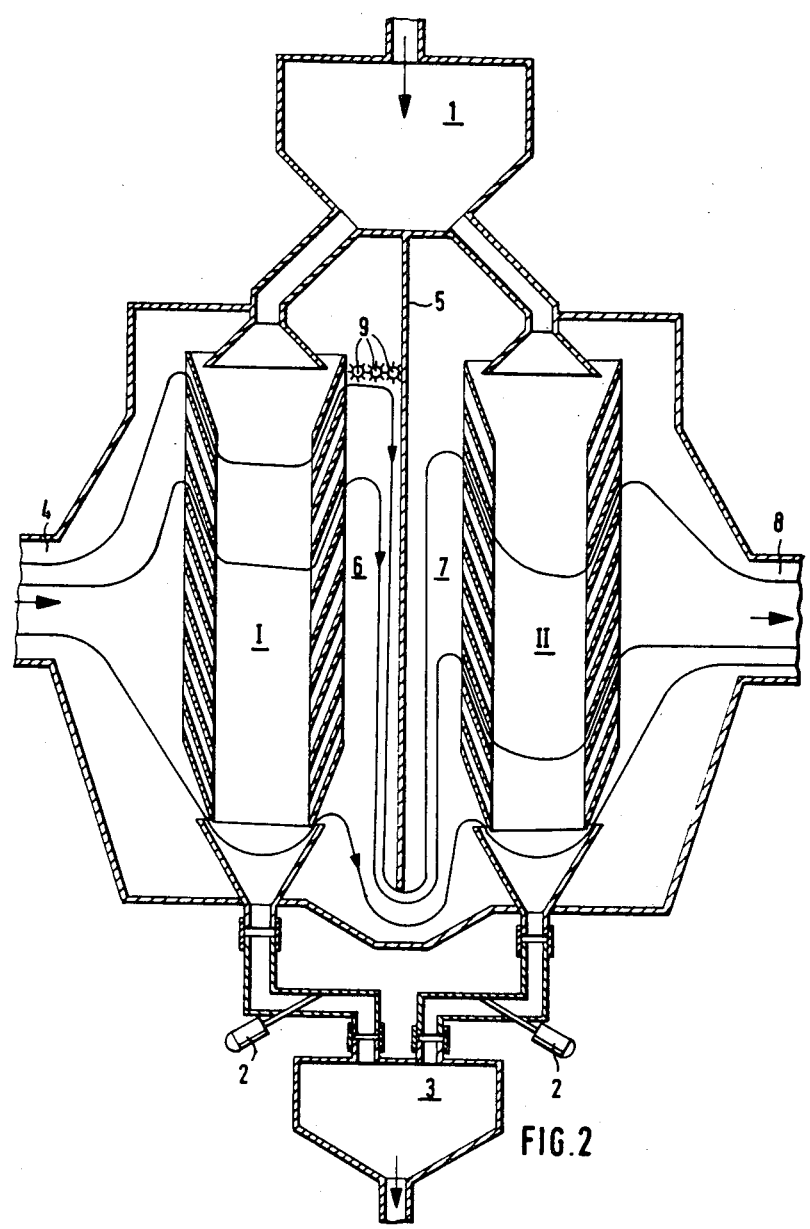
FIG. 2 is a travelling bed reactor with two travelling beds and an intermediate partition separating them with an opening located at the lower end and an ammonia addition arrangement at the upper part of the adsorbers.

According to FIG. 2 the opening from gas accumulation space 6 to gas flow-into space 7 is likewise at the lower end of intermediate partition 5, but the arrangement 9 for forcible mixture of the ammonia is disposed in the upper space of the gas accumulation space 6 directly after travelling bed I in the direction of flow of the exhaust gas. This arrangement works well particularly with small reactors, since the long mixing space guarantees sufficient dwell time for the ammonia and therewith a good mixing with the exhaust gas.

Figure 3:
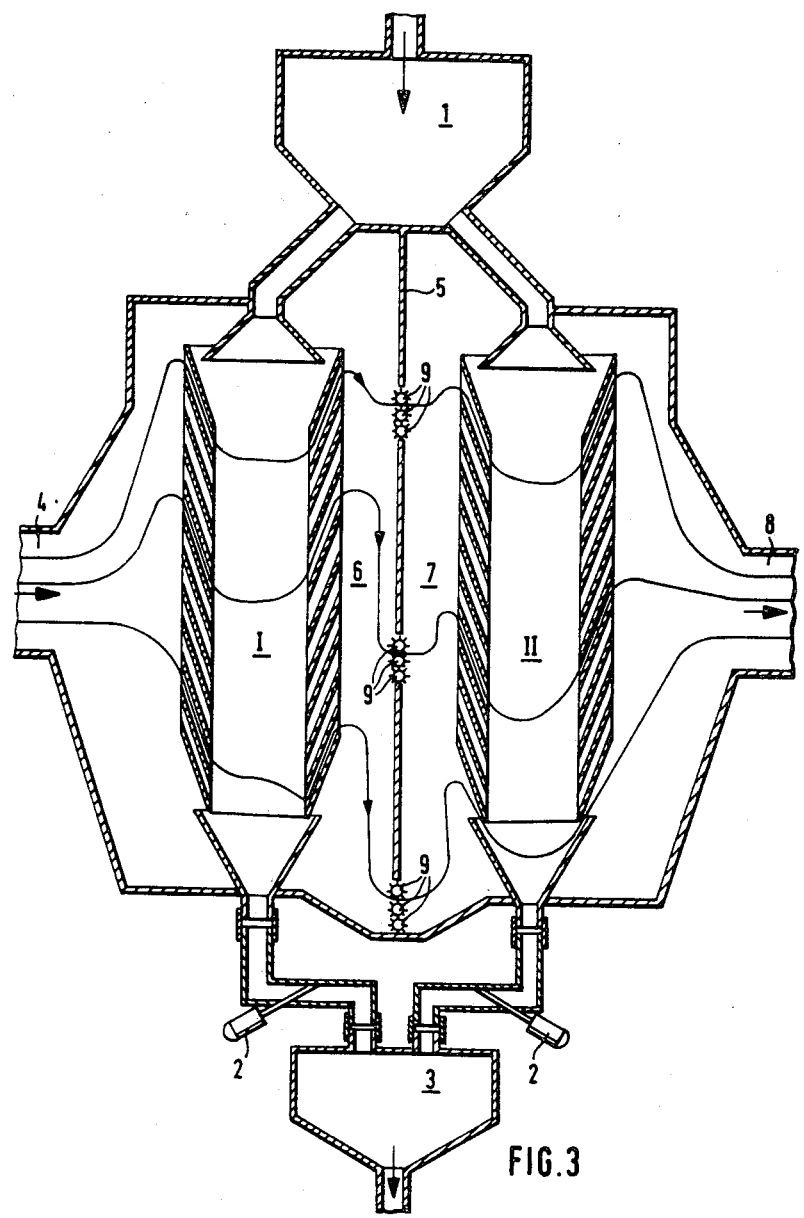
FIG. 3 is a travelling bed reactor with two travelling beds and an intermediate partition with several openings and ammonia addition arrangements at the openings.

FIG. 3 shows a reactor in which several openings are located in the intermediate partition 5, at which places arrangements 9 for the addition of ammonia are disposed, which effect a forced mixture with the exhaust gas. This arrangement works well particularly with tall reactors, since the total exhaust gas stream will be distributed into several individual streams, with associated arrangements 9 for the addition of ammonia.

DESCRIPTION OF THE PREFERRED EMBODIMENT

In a power station with 232 MW electrical output having a bituminous coal furnace with about 1.5% sulfur in the coal, about 750,000 m$^3$/h (iN) exhaust gas with about 1,000 ppm (vol) $SO_2$ was introduced into the chimney. The $NO_x$-portion in the exhaust gas came to about 500 ppm (vol.). The refinement of the power station exhaust gas followed in a two-stage adsorber, with two travelling beds disposed in a common reactor.

Both travelling beds were filled with activated coke, travelling bed I containing 1,071 m$^3$ activated coke with a travelling bed depth of 1,000 mm, and travelling bed II containing 803 m$^3$ activated coke with a travelling bed depth of 750 mm.

The exhaust gas throughput in travelling bed I amounted to 750,000 m$^3$/h (i.N.) and the throughput of activated coke was 19 m$^3$/h. Herewith the $SO_2$-content in the exhaust gas at the outlet of travelling bed I amounted to 300 ppm (vol.), and the $NO_x$-content was 500 ppm (vol.).

Then the exhaust gas stream, after mixing with 438 kg/h ammonia gas, was introduced through travelling bed II at a throughput of 750,000 m$^3$/h (i.N.) with an activated coke throughput of 11 m$^3$/h. At the outlet of travelling bed II the $SO_2$-content of the exhaust gas amounted to 40 ppm (vol.) and the $NO_x$-content amounted to 125 ppm (vol.). Herewith was yielded 1,010 kg/h ammonium sulfate.

It thereby resulted that the exhaust gas which was introduced into the chimney was 96% desulfurized and 75% freed of nitrogen oxides.

The nitrogen oxides were transformed in the reactor into nitrogen and steam and left thus with the exhaust gas in the chimney. The ammonium sulfate in travelling bed II was carried out together with the activated coke. Through filtering both were separated from each other. The portion of ammonium sulfate located in the volume of the pores was removed by thermal regeneration and led away with the $SO_2$-rich gas.

It will be understood that each of the elements described above, or two or more together, may also find a useful application in other types of reactors differing from the types described above.

While the invention has been illustrated and described as embodied in a method for the removal of sulfur oxides and nitrogen oxides from exhaust gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method for removal of sulfur oxides and nitrogen oxides from exhaust gases, which additionally contain oxygen and steam, by addition of gaseous ammonia at temperatures between about 110° and 180° C., whereby the exhaust gases travel in the interior of a reactor across a travelling bed, which goes from above to below, of granulated, carbon-containing adsorbent, whereby in a first travelling bed initially a large portion of the sulfur oxides is absorptively removed and in a second travelling bed after dosed addition of gaseous ammonia the nitrogen oxides are catalytically reduced to nitrogen as well as further sulfur oxides being separated, the improvement comprising extending the path of said exhaust gas between said first and said second travelling bed and introducing into the volume of the exhaust gas stream between said first and said second travelling bed a forced mixture of dosed added ammonia with the exhaust gas departing from said first travelling bed.

2. Method according to claim 1, wherein said ammonia is introduced in the exhaust gases in one or more places in the direction of flow of the exhaust gases.

3. Method according to claim 1, wherein said dosed added ammonia is introduced in smaller amounts in an upper space and in larger amounts in a lower space of said volume of the exhaust gas stream between said travelling beds.

* * * * *